United States Patent [19]

Yano

[11] Patent Number: 5,706,065
[45] Date of Patent: Jan. 6, 1998

[54] LIGHT DIFFUSER FOR A LIQUID CRYSTAL DISPLAY DEVICE AND MANUFACTURING METHOD THEREOF

[75] Inventor: Tomoya Yano, Kanagawa, Japan

[73] Assignee: Sony Corporation, Tokyo, Japan

[21] Appl. No.: 649,021

[22] Filed: May 16, 1996

[30] Foreign Application Priority Data

May 16, 1995 [JP] Japan .................. 7-117042

[51] Int. Cl.$^6$ .................................................. G02F 1/1335
[52] U.S. Cl. .................................................. 349/112; 349/96
[58] Field of Search ........................ 359/63, 69; 349/96, 349/112

[56] References Cited

U.S. PATENT DOCUMENTS

| | | | |
|---|---|---|---|
| 4,268,127 | 5/1981 | Oshima et al. | 359/63 |
| 4,648,691 | 3/1987 | Oguchi et al. | 359/54 |
| 4,775,222 | 10/1988 | Ohe | 362/26 |
| 5,066,099 | 11/1991 | Yoshida et al. | 359/457 |
| 5,128,783 | 7/1992 | Abileah et al. | 359/48 |
| 5,196,960 | 3/1993 | Matsuzaki et al. | 359/453 |
| 5,262,928 | 11/1993 | Kashima et al. | 359/49 |
| 5,295,048 | 3/1994 | Park et a l. | 359/49 |
| 5,457,572 | 10/1995 | Ishii et al. | 359/457 |
| 5,516,456 | 5/1996 | Shinohara et al. | 359/62 |

*Primary Examiner*—William L. Sikes
*Assistant Examiner*—Teep H. Nguyen
*Attorney, Agent, or Firm*—Hill, Steadman & Simpson

[57] ABSTRACT

A liquid crystal display device and manufacturing method thereof are provided where the liquid crystal display device is equipped with a light diffusion layer that gives sufficient light diffusion while providing easy control of the degree of diffusion of the transmitted light and which can be easily manufactured. The liquid crystal display device of the present invention includes a transmission type liquid crystal panel 1, a light diffuser 10 and a directional backlight 3. The liquid crystal panel 1 includes a pair of glass substrates 1, at the front surface of which the light diffuser 10 is provided. The light diffuser 10 that is characteristic to the present invention is divided up into a first resin layer 11B over which fine particles 8a are dispersed and a second resin layer 12. Since the refractive index of the first resin layer 11B is approximately the same as that of the fine particles 8a, there is no lens effect between the fine particles. This gives the same effect as if the fine particles 8a were put into a single row even if the fine particles 8a are actually overlaid. The visual field angle improving effect of the light diffusion means is therefore maintained while manufacturing is simplified.

14 Claims, 4 Drawing Sheets refractive index of first resin layer ≒ refractive index of beads < refractive index of the second resin layer refractive index of first resin layer ≒ refractive index of beads > refractive index of the second resin layer refractive index of first resin layer ≒ refractive index of beads < refractive index of the second resin layer refractive index of first resin layer ≒ refractive index of beads > refractive index of the second resin layer refractive index of first resin layer > refractive index of second resin layer ≑ refractive index of beads refractive index of first resin layer < refractive index of second resin layer ≑ refractive index of beads

LIGHT DIFFUSER FOR A LIQUID CRYSTAL DISPLAY DEVICE AND MANUFACTURING METHOD THEREOF

BACKGROUND OF THE INVENTION

1. Field of the Invention

The present invention relates generally to the illumination structure of a transmission type liquid crystal display device and, more particularly, to an illumination structure comprising a directional backlight provided at the rear surface side of a transmission type liquid crystal panel and a light diffusing member provided at its front surface side.

2. Description of the Related Art

Liquid crystal display devices are characterized by flat structures and low power consumption and their application has become widespread typically in equipment equipped with liquid crystal display devices such as vehicle panels and lap-top personal computers, as well as in televisions and monitoring equipment etc. Liquid crystal devices cannot be used conveniently in dark places because they are non-light radiating. Backlights for providing rear surface illumination for the display surfaces have been developed with the aim of providing devices that are easier to see and that can be used in dark places. In particular, a transmission type display with a backlight is indispensable to ensure constant ease of vision in liquid crystal display devices for use outside such as vehicle panels for which the light changes from daytime sunlight to night-time darkness.

As mentioned above, the fact that the liquid crystal display devices have a low power consumption is a major benefit. However, this benefit is canceled out if the backlight that provides rear illumination then consumes a great deal of power. A backlight that has a good illumination efficiency is desired, and there may be used a backlight having superior directivity, i.e., a light output distribution close to that of parallel light. On the other hand, it is well known that liquid crystal display devices have a prescribed visual field angle dependence. If liquid crystal display devices are illuminated with a directional backlight, then incident light goes approximately straight through. The amount of light outputted at an angle is therefore relatively low when the display surface is viewed from the display side. The brightness is therefore low when a visual-angle-dependent liquid crystal display device is viewed from an angle (from normal) and visibility is extremely poor.

In order to resolve these drawbacks, a structure was proposed where a light diffusion plate was provided at the output side front surface of the liquid crystal panel. This applicant proposed a "liquid crystal display device and manufacturing method thereof" in a previous application, i.e. Japanese Patent Application No. Hei. 06-211798, the details of which are reviewed in FIG. 4. FIG. 4 is a schematic cross-sectional view showing the basic structure of a liquid crystal display device related to the present invention.

As shown in FIG. 4, the liquid crystal device related to the present invention comprises a transmission type liquid crystal display panel 1, a light diffusion means 2 and a directional backlight 3. The liquid crystal panel 1 comprises a pair of glass substrates 4 and 4a bonded together, with liquid crystal being enclosed in the interposing space. A polarizing plate 5a is then provided on the rear surface of the glass substrate 4a. The directional backlight 3 is provided on the rear side of the liquid crystal panel 1 and provides illuminating light that is almost parallel to the liquid crystal panel 1. The directional backlight 3 in this example comprises a light source 6 and two prism sheets 7 and 7a overlaid with each other. The light source 6 comprises a flat-type fluorescent tube etc. and emits non-directional light. The prism sheets 7 and 7a reflect and refract the non-directional light emitted from the light source 6 to convert the non-directional light to approximately parallel light.

The light diffusion means 2 and a polarizing plate 5 are provided at the front surface side of the glass substrate 4. The light diffusion means 2 diffuses and emits light transmitted by the liquid crystal panel 1. The light diffusion means 2 comprises a light diffusion layer 8 constructed from fine particles 8a and filling material 8b. The filling material 8b is transparent and fills in the spaces between the fine particles 8a. The fine particles 8a have a refractive index that is different from that of the glass substrate 4 constituting the front surface of the liquid crystal panel 1, while the filling material 8b has a refractive index near that of the glass substrate 4. For example, these fine particles 8a are transparent micro beads of an average particle diameter of about 30 μm and of a refractive index of 1.93. This is dramatically different from the refractive index of 1.53 for the glass substrate 4 and provides superior light scattering ability. The glass substrate 4 has a plate thickness of, for example, about 1.1 mm. On the other hand, the transparent filling material 8b is made of, for example, an ultraviolet-curing-type resin of type "3042" can be used ("3042" is a trade mark for modified acrylate resin manufactured by Threebond). The refractive index of this is 1.55, which is approximately the same as the refractive index of the glass substrate 4. Reflections of external light at least the rear surface side of the polarizing plate 5 and the front surface side of the glass substrate 4 can therefore be efficiently controlled by filling the filling material 8b between the polarizing plate 5 and the glass substrate 4.

In the liquid crystal display device and manufacturing method thereof related to the present invention, the fine particles of the light diffusion means have to be lined-up in a row in order to provide a sufficient light diffusion effect, which complicates the manufacture. Also, the degree of diffusion of the light transmitted by the liquid crystal panel can only be controlled by the refractive index of the transparent fine particles, which is difficult to carry out.

SUMMARY OF THE INVENTION

In order to resolve the aforementioned problems, the present invention proposes the following means. The liquid crystal display device of the present invention is basically constructed from a transparent-type liquid crystal panel, a directional backlight and a light diffusion means. The transmission-type liquid crystal panel has a front surface provided with a polarizing plate and an opposite rear surface. The directional backlight is positioned at the rear surface side, and provides light that is almost parallel in such a manner as to be incident on the liquid crystal panel. The light diffusion means is positioned at the front surface side and diffuses and outputs light transmitted by the liquid crystal panel. The characteristic features of the invention are that the light diffusion means consists of two or more resin layers, with a light diffusion layer comprising transparent fine particles being formed in at least one of the resin layers. In the structure, the fine particles have a refractive index approximately equal to that of the resin layer on which the fine particles are formed and different from that of the remaining resin layer on which the fine particles are not formed. The fine particles are formed in such a manner as to be laid out in a number of layers.

The aforementioned liquid crystal display device is made using the following steps. First, a liquid crystal display panel is assembled by bonding a pair of glass substrates together in such a manner that liquid crystal is sealed in the intervening space. Next, transparent filling material is applied to the surface of one of the glass substrates of the liquid crystal panel, to thereby form a bonding layer. Then, fine particles are spread over a polarizing plate on which an adhesive film is formed so as to lay a multi-layer light diffusion layer. Finally, the light diffusion layer and the bonding layer are press-bonded so as to be overlaid with each other to form a single body and fine particle spaces are then filled in with filling material. Preferably, an ultraviolet-curing-type filling material is applied in the applying process and exposed to ultraviolet rays while the polarizing plate and the liquid crystal panel are being press-bonded in the press-bonding process.

According to the present invention, the transmission-type liquid crystal panel is efficiently illuminated using a directional backlight having an output light distribution that is close to that of parallel light. Further, the light diffusion means is provided at the front surface of the liquid crystal panel. In this way, approximately vertically incident illuminating light provides a sufficient distribution of light in inclined directions after having passed through and having been diffused by the liquid crystal panel. A practical level of display brightness at inclined directions can therefore be obtained even for liquid crystal panels that are visual field angle dependent and visibility can be improved. Further, the light diffusion means is constructed from two or more layers of resin, with a light diffusion layer comprising transparent fine particles being formed in at least one of these resin layers. The fine particles have a refractive index that is approximately the same as that of the resin layer on which the fine particles are formed and is different from that of the other resin layer. In particular, the fine particles are formed so as to be laid in a number of layers. The fine particles therefore provide sufficient diffusion of the illuminating light, and the process for making the fine particles is simplified to facilitate formation of the light diffusion layer.

DETAILED DESCRIPTION OF THE PREFERRED EMBODIMENTS

Figure 1A:
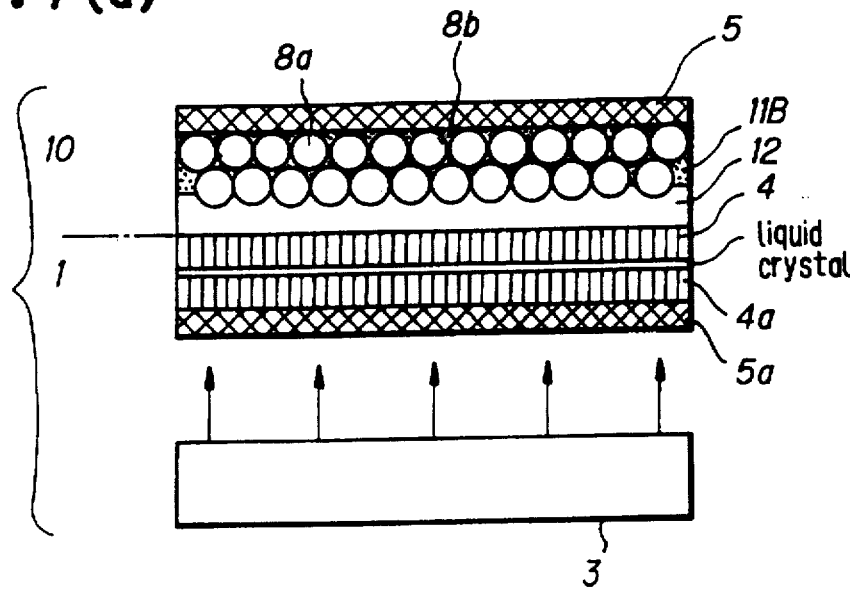
FIG. 1(a) is a schematic cross-sectional view showing a first embodiment of the liquid crystal display device of the present invention.

In the following, a detailed description is given of the liquid crystal display device and manufacturing method thereof of the present invention with reference to FIG. 1a to FIG. 3b. Portions which are common to items listed in the prior art are given the same reference numerals and their description is omitted. The fine particles used in the present invention may, for example, be transparent micro beads having a diameter of 30 μm and a refractive index of 1.93.

First Embodiment

Figure 1B:
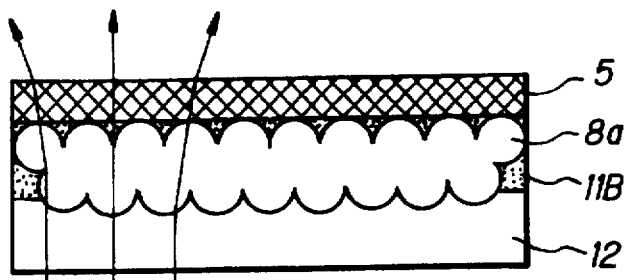
FIG. 1(b) is a schematic cross-sectional view showing a first example of the light diffusion means.
Figure 1C:
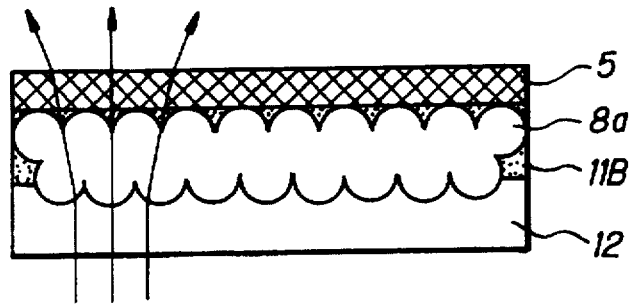
FIG. 1(c) is a schematic cross-sectional view showing a second example of the light diffusion means.

First, a first embodiment of the liquid crystal display device of the present invention will be described with reference to FIGS. 1a to 1c. FIG. 1(a) is a schematic cross-sectional view showing a first embodiment of the liquid crystal display device of the present invention, FIG. 1(b) is a schematic cross-sectional view showing a first example of the light diffusion means and FIG. 1(c) is a schematic cross-sectional view showing a second example of the light diffusion means.

In FIG. 1(a), the liquid crystal display of the present invention comprises a transmission-type liquid crystal panel 1, a light diffusion means 10 and a directional backlight 3. The liquid crystal panel 1 has a structure where a pair of glass substrates 4 and 4a are stuck together, with liquid crystal being enclosed within the space between both substrates. A polarizing plate 5a is then provided at the rear surface side of the glass substrate 4a. These glass plates have a refractive index of, for example, about 1.53. The directional backlight 3 has a construction that is the same as previously mentioned and is provided at the rear surface of the liquid crystal panel 1 so as to provide approximately parallel illuminating light to the liquid crystal panel 1.

The light diffusion means 10 is provided at the front side of the glass substrate 4, at the upper part of which a polarizing plate 5 is provided. The light diffusion means 10, which is a characteristic feature of the present invention, is divided up into a first resin layer 11B and a second resin layer 12. A construction is adopted where fine particles (hereinafter referred to simply as "beads") 8a are dispersed in just one of the resin layers, for example, to form the first resin layer 11B. The spaces between the fine particles 8a are filled up with transparent filling material 8b to together form the layer 11B. The fine particles 8a and the filling material 8b at the first resin layer 11B are selected to have approximately the same refractive index. Because of this, there is no lens effect between the fine particles and this stacked structure of the fine particles 8a has the same effect as the aligned single-layer structure. In other words, the spaces between adjacent beads does not change the refractive index.

Further, the fine particles 8a are partially exposed to the side of the second resin layer 12. Moreover, the second resin layer 12 is formed so as to have a refractive index that is different from that of the first resin layer 11B and from that of the beads. In this way, lenses are formed at the boundary of the second resin layer 12 and the fine particles 8a of the first resin layer 11B.

On the other hand, the reflection of a large part of the external light is suppressed by the polarizing plate 5. Diffusion is greater and the visual field angle is wider when the refraction index of the fine particles 8a is larger. However, the illuminating light also includes a few angled components in addition to the parallel components and the angled components are also diffused in the forward direction when the refractive index of the fine particles 8a is high. The display contrast therefore has a tendency to become poor. In this way, the refractive index of the fine particles 8a is therefore selected so as to maintain a balance between the visual field angle and the contrast.

A simple description is given of an example of the method of manufacturing the light diffusion means. After assembling the liquid crystal panel 1, the transparent filling material 8b is applied to the surface of the second resin layer on one side of the liquid crystal panel to form a bonding layer. Next, fine particles 8a are spread onto the polarizing plate 5 on which an adhesive film is provided by an application process, so as to establish the first resin layer 11 of the multi-layer structure. Finally, the light diffusion means and the bonding layer are bonded together using a press-bonding process so as to be overlaid with each other to form a single body and the filling material is filled into the spaces between the fine particles 8a.

Next, a detailed description of the light diffusion means is given with reference to FIG. 1(b). In FIG.(b) of the drawings, where the refractive index of the first resin layer 11B and the refractive index of the fine particles 8a are approximately the same and the refractive index of the second resin layer is larger than that of the layer 11B and fine particles 8a, a concave lens is formed. Illuminating light incident on the rear surface side of the light diffusion layer constructed in this way passes through the second resin layer 12 and is then incident on the first resin layer 11B. The incident light is then refracted at the boundary surface of the fine particles 8a and the second resin layer 12 and the surface of the polarizing plate 5 so as to be outputted in a diffused state. In this way, a sufficient amount of light is distributed in inclined directions for wide angle viewing.

In FIG. 1(c) of the drawings, where the refractive index of the first resin layer 11B and the refractive index of the fine particles 8a are approximately the same and the refractive index of the second resin layer is smaller than that of the layer 11B and the fine particles 8a, a convex lens is formed. Illuminating light incident on the rear surface side of the light diffusion layer constructed in this way passes through the second resin layer 12 and is then incident on the first resin layer 11B. The incident light is then refracted at the boundary surface of the fine particles 8a and the second resin layer 12 and the surface of the polarizing plate 5 so as to be outputted in a diffused state, thereby improving the visual field angle. Further, in the present invention, boundary surface (the interface of the first resin layer 11B and the polarizing plate 5 or the interface of the second resin layer 12 and the glass substrate 4) reflections can be eliminated by equalizing the refractive index of the first resin layer 11B or the second resin layer 12 to that of the adjacent glass substrate. Lowering of the contrast as a result of reflections of external light can therefore be reduced.

Second Embodiment

Figure 2A:
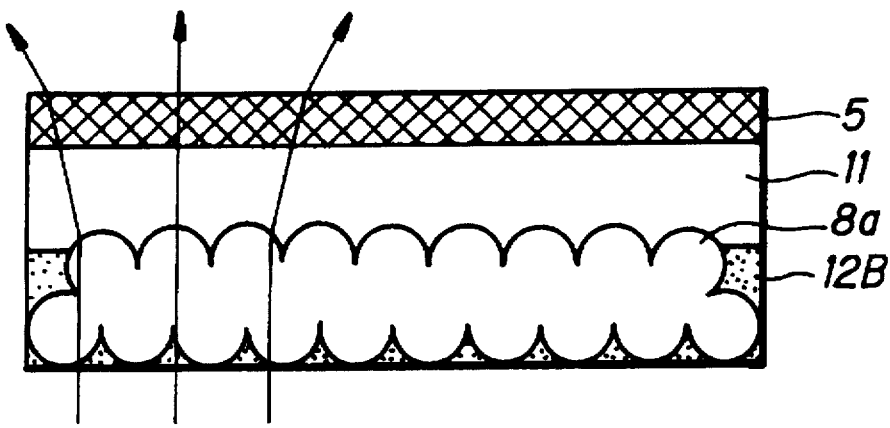
FIG. 2(a) is a schematic cross-sectional view showing a first example of the light diffusion means of a second embodiment.
Figure 2B:
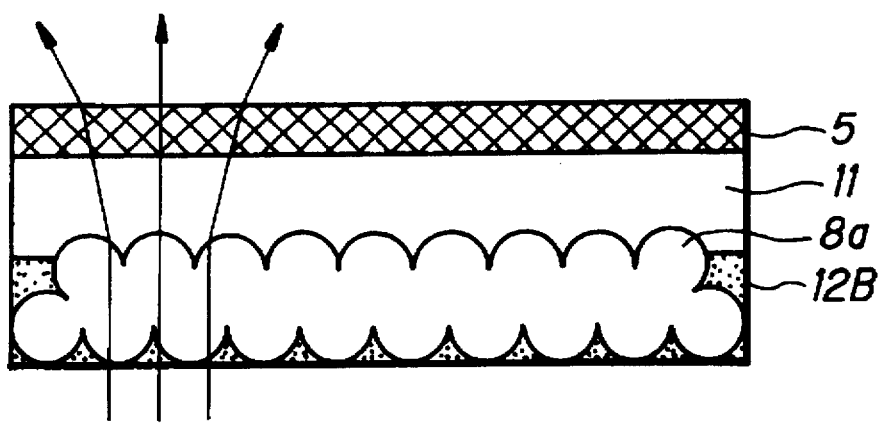
FIG. 2(b) is a schematic cross-sectional view showing a second example of the light diffusion means.

This embodiment provides an example where fine particles are dispersed over the second resin layer rather than the first resin layer and is described with reference to FIGS. 2a and 2b. FIG. 2(a) is a schematic cross-sectional view showing a first example of the light diffusion means of the second embodiment and FIG. 2(b) is a schematic cross-sectional view showing a second example of the light diffusion means.

In FIG. 2(a) of the drawings, where fine particles 8a of approximately the same refractive index as that of a second resin layer 12B are dispersed at the second resin layer 12B and the refractive index of the second resin layer 12B is smaller than that of a first resin layer 11, a concave lens is formed. Illuminating light shone onto the rear surface of the light diffusion layer constructed in this way passes through the second resin layer 12B to the first resin layer 11. The incident light is then refracted at the boundary surface of the fine particles 8a and the first resin layer 11 and the surface of the polarizing plate 5 so as to be outputted in a diffused state. The dependence on the visual field angle is therefore improved for the liquid crystal display of this invention.

In (b) of the same drawing, where fine particles 8a of approximately the same refractive index as that of the second resin layer 12B are dispersed over the second resin layer 12B and the refractive index of the second resin layer 12B is larger than that of the first resin layer 11, a convex lens is formed. Illuminating light shone onto the rear surface of the light diffusion layer having this kind of structure then passes through the second resin layer 12B into the first resin layer 11. The incident light is then refracted at the boundary surface of the fine particles 8a and the first resin layer 11 and the surface of the polarizing plate 5 so as to be outputted in a diffused state. A sufficient amount of light is therefore also distributed in inclined directions for wide angle viewing. According to this embodiment, a comparatively bright display surface can be seen even when the front surface of the liquid crystal panel is observed at an angle. In addition, this light diffusion layer suppresses the reflection of external light and the contrast of the images produced on the liquid crystal display panel is therefore improved.

Third Embodiment

Figure 3A:
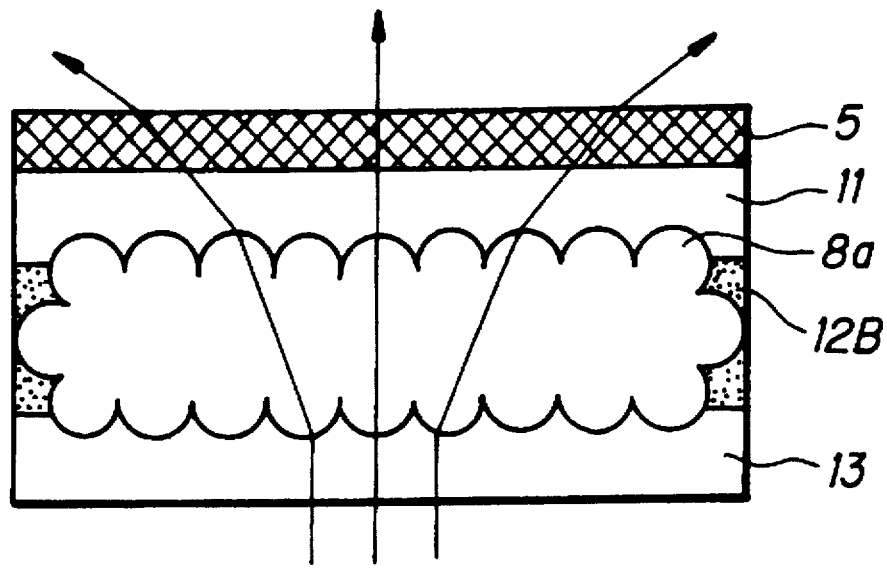
FIG. 3(a) is a schematic cross-sectional view showing a first example of the light diffusion means of a third embodiment.

This embodiment is an example where the resin layer of the light diffusion means is multi-layered and is described with reference to FIGS. 3a and 3b. FIG. 3(a) is a schematic cross-sectional view showing a first example of the light diffusion means of the third embodiment and FIG. 3(b) is a schematic cross-sectional view showing a second example of the light diffusion means.

In FIG. 3(a) of the drawings, the light diffusion means of this embodiment adopts a three layer structure for the resin layer where fine particles are dispersed in a second resin layer 12B and a first resin layer 11 and a third resin layer 13 of a different refractive index from that of the second resin layer 12B is formed at the front surface and the rear surface of the second resin layer 12B, respectively. Illuminating light shone onto the rear surface of the light diffusion layer with this kind of structure then passes through the third resin layer 13 and is sequentially shone into the second resin layer 12B and the first resin layer 11. The incident light is then refracted at the boundary surface of the fine particles 8a and the third resin layer 13, refracted again at the boundary surface of the fine particles 8a and the first resin layer 11, and the polarizing plate 5 so as to be outputted in a diffused state. In this way, a satisfactory independence on the visual field angle is assured.

Figure 3B:
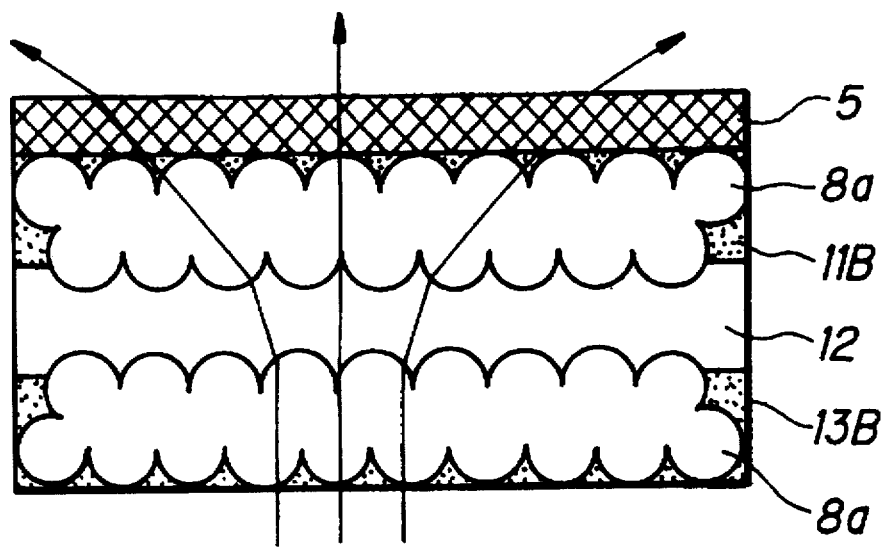
FIG. 3(b) is a schematic cross-sectional view showing a second example of the light diffusion means.
Figure 4:
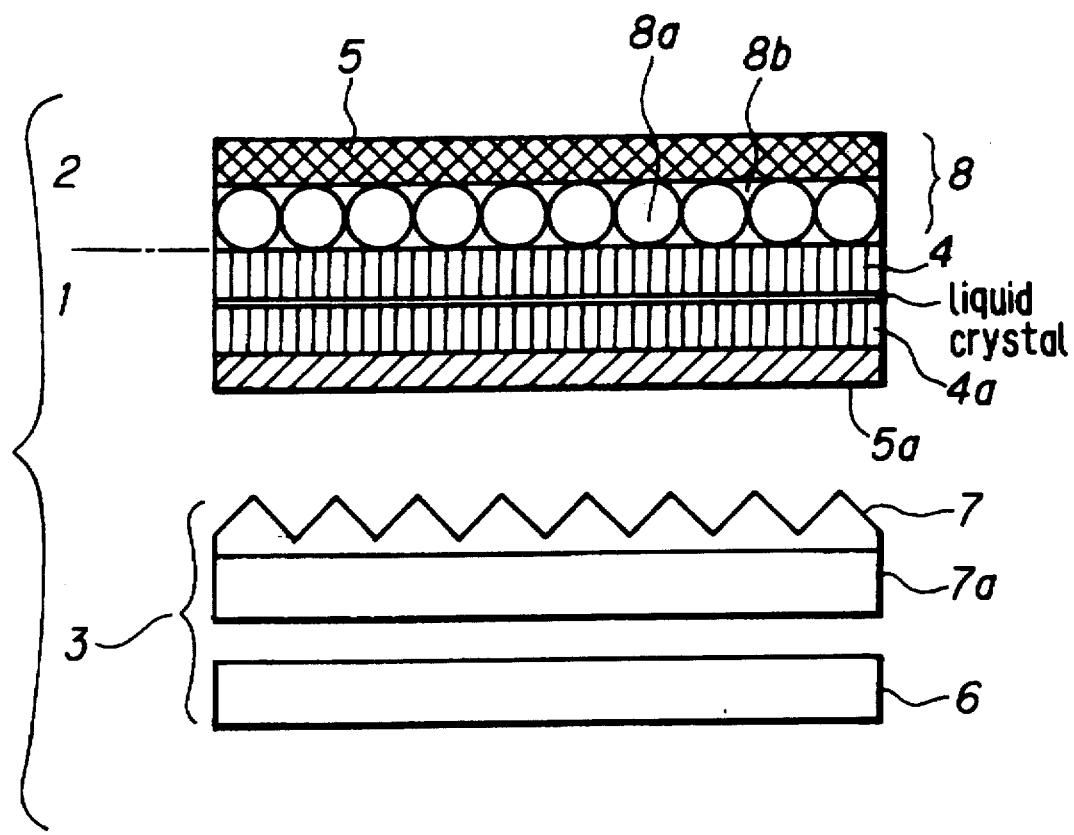
FIG. 4 is a schematic cross-sectional view showing the basic structure of the liquid crystal display device related to the present invention.

In FIG. 3(b) of the drawings, this embodiment adopts a three layer structure for the light diffusion means where fine particles are dispersed at the first resin layer 11B and the third resin layer 13B, and a second resin layer 12 of a refractive index that is different from that of the first resin layer and the third resin layer is formed as the central layer. Illuminating light shone onto the rear surface of the light diffusion layer constructed in this way passes through the third resin layer 13B and sequentially enters the second resin layer 12 and the first resin layer 11B. The incident light is then refracted at the boundary surface of the fine particles 8a and the second resin layer 12, and refracted again at the boundary surface of the second resin layer 12 and the fine particles 8a, and the polarizing plate 5 so as to be outputted in a diffused state. In this way, a sufficient visual field angle is assured. In the present invention, the extent of the diffusion at the light diffusion layer can be controlled using the number of layers regardless of the layer thickness of the fine particles. Therefore, with the method of manufacturing the liquid crystal display device of the present invention, it is no longer necessary to have the fine particles 8a spread out in a row, to thereby allow mass-production of a micro-lens array at low costs.

As described above, according to the present invention, the characteristics of the light diffusion layer do not change even if fine particles are spread out so as to be overlaid in a number of layers between the front surface side glass substrate of the liquid crystal panel and the polarizing plate. Further, the extent to which the light transmitted by the liquid crystal panel is diffused can be controlled using the number of resin layers. This both improves the visual field angle of the light diffusion layer and makes manufacture easier. Although other modifications and changes may be suggested by those skilled in the art, it is the intention of the inventor to embody within the patent warranted hereon all changes and modifications as reasonably and properly come within the scope of his contribution to the art.

I claim:

1. A liquid crystal display device, comprising:

a front substrate;

a rear substrate sealed together with said front substrate with a gap therebetween;

a liquid crystal material filled in said gap between said front substrate and said rear substrate;

a front polarizing plate on a surface of said front substrate;

a rear polarizing plate on a surface of said rear substrate;

a light diffusing means for diffusing light, said light diffusing means being between said front substrate and said front polarizing plate, said light diffusing means including at least two resin layers of mutually different refractive index;

a plurality of fine transparent particles in at least one of said at least two resin layers;

a directional backlight at a rear side of said liquid crystal cell to provide parallel light to said liquid crystal cell.

2. A liquid crystal display device as claimed in claim 1, further comprising:

a prism sheet between said directional backlight and said liquid crystal cell.

3. A liquid crystal display device as claimed in claim 1, wherein said fine transparent particles are of a diameter of about 30 μm and of a refractive index of about 1.93.

4. A liquid crystal display device as claimed in claim 1, wherein said at least two resin layers are two resin layers, a front one of said two resin layers having said fine transparent particles.

5. A liquid crystal display device as claimed in claim 1, wherein said at least two resin layers are two resin layers, a rear one of said two resin layers having said fine transparent particles.

6. A liquid crystal display device, comprising:

a front substrate;

a rear substrate sealed together with said front substrate with a gap therebetween;

a liquid crystal material filled in said gap between said front substrate and said rear substrate;

a front polarizing plate on a surface of said front substrate;

a rear polarizing plate on a surface of said rear substrate;

a light diffusing means for diffusing light, said light diffusing means being between said front substrate and said front polarizing plate, said light diffusing means including at least two resin layers;

a plurality of fine transparent particles in at least one of said at least two resin layers;

a directional backlight at a rear side of said liquid crystal cell to provide parallel light to said liquid crystal cell wherein said at least one resin layer having said plurality of fine transparent particles is of a different refractive index than another of said resin layers.

7. A liquid crystal display device, comprising:

a front substrate;

a rear substrate sealed together with said front substrate with a gap therebetween;

a liquid crystal material filled in said gap between said front substrate and said rear substrate;

a front polarizing plate on a surface of said front substrate;

a rear polarizing plate on a surface of said rear substrate;

a light diffusing means for diffusing light, said light diffusing means being between said front substrate and said front polarizing plate, said light diffusing means including at least two resin layers;

a plurality of fine transparent particles in at least one of said at least two resin layers;

a directional backlight at a rear side of said liquid crystal cell to provide parallel light to said liquid crystal cell wherein said at least one resin layer having said plurality of fine transparent particles is of a refractive index substantially identical to a refractive index of said fine transparent particles.

8. A liquid crystal display device, comprising:

a front substrate;

a rear substrate sealed together with said front substrate with a gap therebetween;

a liquid crystal material filled in said gap between said front substrate and said rear substrate;

a front polarizing plate on a surface of said front substrate;

a rear polarizing plate on a surface of said rear substrate;

a light diffusing means for diffusing light, said light diffusing means being between said front substrate and said front polarizing plate, said light diffusing means including at least two resin layers;

a plurality of fine transparent particles in at least one of said at least two resin layers;

a directional backlight at a rear side of said liquid crystal cell to provide parallel light to said liquid crystal cell wherein said at least two resin layers are three resin layers, a middle one of said three resin layers having said fine transparent particles.

9. A liquid crystal display device, comprising:

a front substrate;

a rear substrate sealed together with said front substrate with a gap therebetween;

a liquid crystal material filled in said gap between said front substrate and said rear substrate;

a front polarizing plate on a surface of said front substrate;

a rear polarizing plate on a surface of said rear substrate;

a light diffusing means for diffusing light, said light diffusing means being between said front substrate and said front polarizing plate, said light diffusing means including at least two resin layers;

a plurality of fine transparent particles in at least one of said at least two resin layers;

a directional backlight at a rear side of said liquid crystal cell to provide parallel light to said liquid crystal cell wherein said at least two resin layers are three resin layers, two outer ones of said three resin layers having said fine transparent particles.

10. A light diffuser for a display device, comprising:

a panel of transparent material having first and second major surfaces;

a first resin layer of a first refractive index on said first major surface of said panel;

a plurality of microbeads in said first resin, said microbeads being at least two layers deep on said first major surface; and a second resin layer of a second refractive index on said first major surface of said panel, said first and second refractive indexes being mutually different.

11. A light diffuser as claimed in claim 10, wherein said first resin layer is directly on said panel.

12. A light diffuser as claimed in claim 10, wherein said second resin layer is directly on said panel.

13. A light diffuser as claimed in claim 10, wherein one layer of said microbeads are at a junction between said first resin layer and said second resin layer.

14. A light diffuser as claimed in claim 10, wherein said microbeads are of a refractive index substantially identical to said first refractive index of said first resin layer.

* * * * *